US008935670B2

(12) United States Patent (10) Patent No.: US 8,935,670 B2
Kemmler et al. (45) Date of Patent: Jan. 13, 2015

(54) SYSTEM AND METHOD FOR BUSINESS FUNCTION REVERSIBILITY

(75) Inventors: Andreas Kemmler, Bönnigheim (DE); Torsten Kamenz, Wiesloch (DE)

(73) Assignee: SAP SE, Walldorf (DE)

( * ) Notice: Subject to any disclaimer, the term of this patent is extended or adjusted under 35 U.S.C. 154(b) by 7 days.

(21) Appl. No.: 13/280,872

(22) Filed: Oct. 25, 2011

(65) Prior Publication Data

US 2012/0102364 A1 Apr. 26, 2012

Related U.S. Application Data

(63) Continuation-in-part of application No. 12/911,245, filed on Oct. 25, 2010.

(30) Foreign Application Priority Data

Oct. 18, 2011 (EP) .................................... 11185647

(51) Int. Cl.
*G06F 9/44* (2006.01)
*G06F 11/00* (2006.01)
*G06F 15/16* (2006.01)
*G06F 9/445* (2006.01)

(52) U.S. Cl.
CPC ....................................... *G06F 8/65* (2013.01)
USPC .............. 717/124; 717/168; 714/40; 709/203

(58) Field of Classification Search
CPC ............... G06F 8/65; G06F 8/67; G06F 8/68; G06F 8/60
See application file for complete search history.

(56) References Cited

U.S. PATENT DOCUMENTS

| | | | | |
|---|---|---|---|---|
| 5,790,425 A | * | 8/1998 | Wagle | 709/218 |
| 6,023,773 A | * | 2/2000 | O'Donnell et al. | 714/40 |
| 8,024,399 B2 | * | 9/2011 | Reisman | 709/203 |
| 2002/0138595 A1 | * | 9/2002 | Ruellan et al. | 709/219 |
| 2006/0026586 A1 | * | 2/2006 | Remmel et al. | 717/170 |
| 2006/0195839 A1 | * | 8/2006 | Lin et al. | 717/174 |
| 2006/0271640 A1 | | 11/2006 | Muldoon et al. | |
| 2007/0271275 A1 | * | 11/2007 | Fassette et al. | 707/10 |
| 2008/0140475 A1 | | 6/2008 | Li et al. | |
| 2009/0037881 A1 | * | 2/2009 | Christy et al. | 717/124 |
| 2009/0228794 A1 | * | 9/2009 | Hasegawa et al. | 715/705 |
| 2009/0295461 A1 | | 12/2009 | Cesare et al. | |

OTHER PUBLICATIONS

Yash Jonnalagadda, "SAP Enhancement and Switch Framework", 2008.*
Schaffry ("SAP info. Enhancing the ERP Core without Modifications (Part 2)", Jan. 16, 2008.

* cited by examiner

*Primary Examiner* — Don Wong
*Assistant Examiner* — Mohammad Kabir
(74) *Attorney, Agent, or Firm* — Kenyon & Kenyon LLP

(57) ABSTRACT

Embodiments of the present invention may provide "undo" (e.g., rollback) features, along with data management simplification features, to an update package model of software suite development/evolution. New functions, which may have disruption effects for customers, may be installed into the core configuration data with inactive switches. Upon activation, a switch status may change, and a query filter may use the activated function (e.g., as associated with the switch ID). Original functions may be maintained, giving the user the ability to deactivate an activated function, and thereby reverting the system back to the prior configuration status.

15 Claims, 5 Drawing Sheets

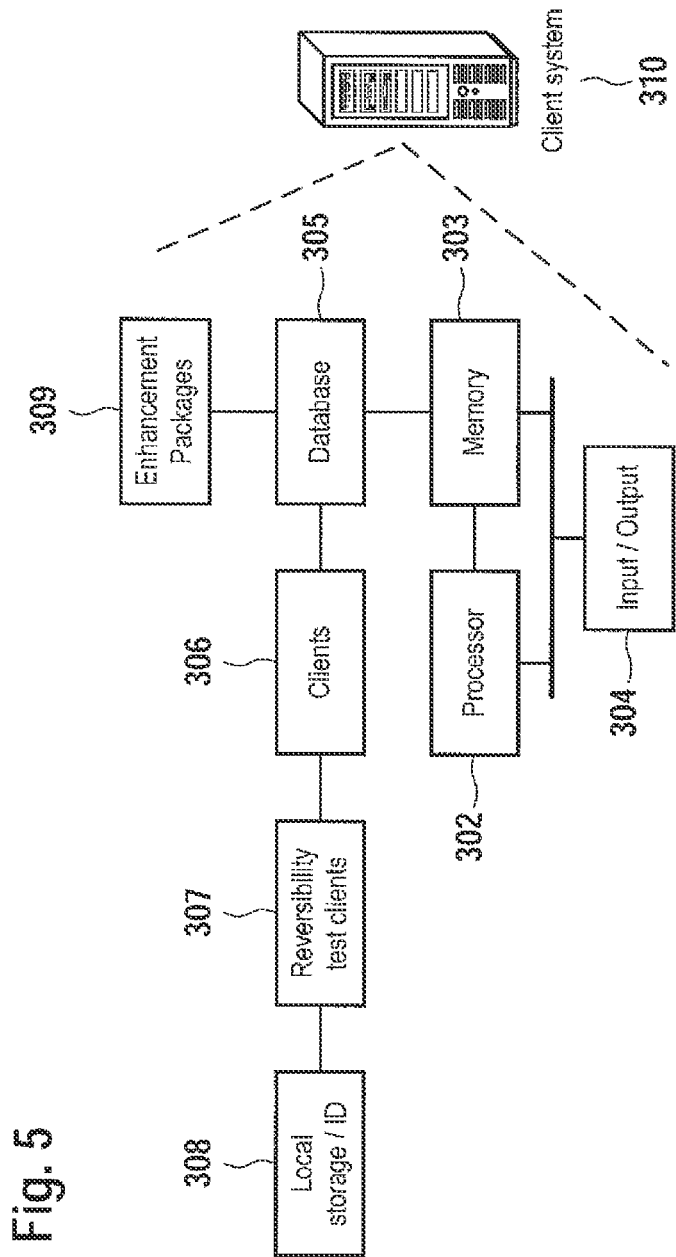

SYSTEM AND METHOD FOR BUSINESS FUNCTION REVERSIBILITY

CROSS-REFERENCE TO RELATED APPLICATIONS

This application is a continuation-in-part and claims priority to U.S. patent application Ser. No. 12/911,245, filed on Oct. 25, 2010, and which is incorporated by reference in its entirety. This application also claims priority to European Patent Application Serial No. EP11185647, filed on Oct. 18, 2011, and which is incorporated by reference in its entirety.

FIELD OF INVENTION

Embodiments of the present invention relate to the field of multi-client computer systems, and more particularly to updating of installed executable program code that runs for multiple users in a multi-client computer system. Embodiments of the present invention also relate to a respective computer program product.

BACKGROUND

Business entities require business software for performing an array of essential tasks. Communication, planning, inventory control, order processing, systems monitoring, and nearly every facet of a business' operations. A business entity often requires a software solution with features, interfaces, data management, and other aspects unique to that one specific company. Yet, core functions may be similar among the different unique solutions. These core functions may be provided to several, unique business entities, e.g., companies. In addition to needing to vary several initial deployments among a variety of customer-companies, these varied implementations may need constant updating, to evolve with the evolving business' needs.

Software developers may design and provide a set of software tools in a generic or universal form. These tools may be controlled by a set of customization data that is specific to each unique customer. Unlike the companies transactional data, which may include millions of data records or more, the configuration and customization data may represent a very small and rarely changing set of data. This data may modify, instantiate, activate, or otherwise implement the provided tools, in a customer specific manner. With the configuration data, customers may be able to modify every aspect of their software experience, including defining the user interfaces, what functions are available on the interfaces, and/or what fields are provided to the user.

To help maintain these software packages, SAP® AG introduced an enhancement package strategy as a means to simplify the way customers manage and deploy new software functionality. Customers may selectively implement these software innovations from a developer and activate the software upon business demand. As a result, customers can isolate the impact of software updates from introducing/rolling out new functionality and bring new functionality online faster through shortened testing cycles. Customers no longer have to plan for major releases every few years. They may now choose to selectively implement the business functions or technical improvements that add the value that matters most to their business. A development team may use enhancement packages to quickly and easily deliver business and industry-specific functionality, enterprise services, and other functions that help improve and simplify the use of software through user interfaces and other end-to-end process improvements.

These enhancement packages may be cumulative from a functional perspective, e.g., current enhancement packages may contain the entire content of earlier packages. So each enhancement package may be based on the previous one. Enhancement packages may also have the same maintenance duration as the underlying core application. Each enhancement package may contain new versions of existing software components. With the enhancement packages customers can choose which software components are updated in their systems, depending on the new/extended functionality they want to use.

In some solutions it may be that new functionality must be explicitly switched on to become active/visible in the system. A unit within an enhancement package which can be activated/switched on may be referred to as a "business function." Activating a business function may trigger switches, which then may influence the execution of the code enhancements. These switches may ensure that customers only see, feel, or can make use of the new functionality if they have activated them. The activation process may additionally start a job in the overall system that automatically performs all the needed changes in the system.

BRIEF DESCRIPTION OF THE DRAWINGS

In the following, preferred embodiments of the invention will be described in greater detail by way of example only making reference to the drawings in which:

FIG. 5 illustrates an example system for executing a reversible activation method of a switch framework, according to one example embodiment of the present invention.

In the following, like numbered elements in these figures are either similar elements or perform an equivalent function. Elements which have been discussed previously will not necessarily be discussed in later figures if the function is equivalent.

DETAILED DESCRIPTION

Figure 1:
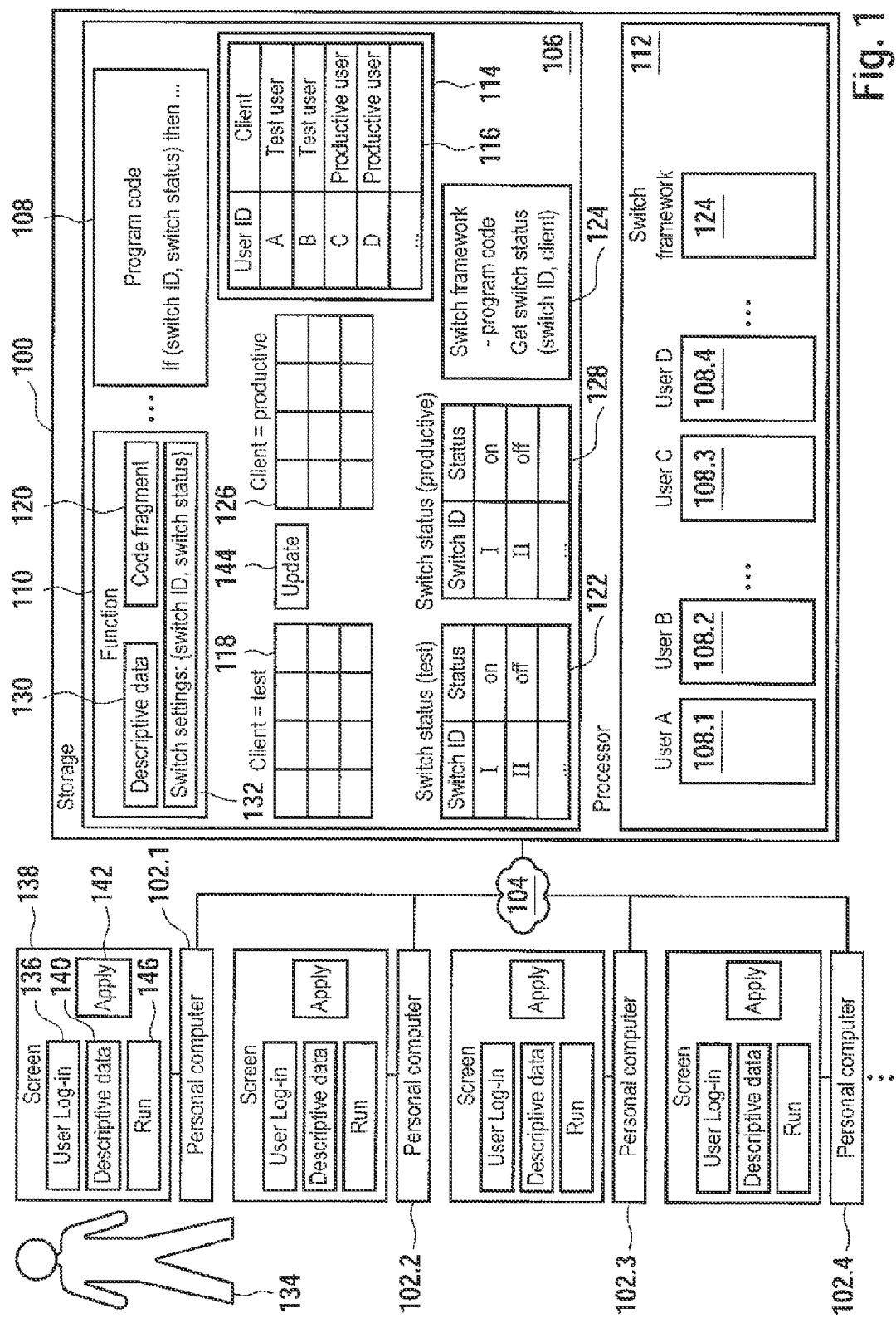
FIG. 1 is a block diagram illustrating a multi-client computer system according to an embodiment of the present invention.

Embodiments of the present invention may provide for a method of updating executable program code and a method for providing reversible enhancement functions.

Likewise, embodiments of the present invention may provide for respective computer program products and systems.

Embodiments of the present invention may be particularly advantageous as testing of a program update is enabled without disrupting or otherwise influencing productive execution of the program code. This is made possible by usage of the multi-client concept for the new purpose of defining a test client and a productive client that are isolated from each other. This isolation of the test client from the productive client is accomplished by storing separate sets of logical values for both the switches and the user data in a database. Execution of the program code for a user that is assigned to the test client only affects the logical values of the switches and the data that are assigned to the test client such that productive execution of the program code is not affected by the testing. This enables to reverse the updating of the program code as updating the program code for the test client does not affect the productive client.

A 'multi-client computer system' as used herein may encompass any computer system that enables execution of multiple instances of the same program code for multiple users in parallel. The multiple users are assigned to at least first and second logical clients such that execution of the program code for a user being assigned to a first client does not affect in any way the second client; in particular data containing client or user data is assigned to one of the clients such that a user being assigned to another one of the clients cannot read or write that data assigned to the other client. Such multi-client computer systems are also referred to as application service provider (ASP) computer systems or cloud computing computer systems that are designed for the outsourcing of computing power to an external service provider.

Embodiments of the present invention may be particularly advantageous as such as multi-client computer system is not used for the purpose of outsourcing but for enabling non-disruptive and reversible testing of program updates.

A 'software switch' or 'switch' as used herein may be a software implemented switching function for switching on or off the execution of a particular fragment of executable code that implements a function.

A 'client' as used herein refers to a logical entity that may be constituted by a group of users that is assigned to a given client. It is important to note that a 'client' or 'logical client' as used herein does not relate to a client computer system or to a client-server architecture but to the client concept that is implemented in a multi-client computer system enabling the outsourcing of computing power from multiple clients, e.g. companies, to an external operator of the multi-client computer system.

Embodiments of the present invention concern further improvements in the enhancement package model. Currently, by virtue of the switch framework, the delivery of enhancement packages does not cause disruption, and customers may select only those functions they want, limiting disruption to those specific enhancements. However, the enhancements often overwrite configuration data, adding functions, changing functions, deleting/replacing functions, etc. The disruption to the system caused by these activations cannot easily be assessed before installation, and there may be no way to reverse the installation in a cost/time effective manner. Thus, example embodiments of the present invention relate to additional procedures, functions, and systems for facilitating a reversal of enhancement activations.

A 'computer-readable storage medium' or 'computer program product' as used herein may encompass any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, punched tape, punch cards, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. References to a computer-readable storage medium should be interpreted as possibly being multiple computer-readable storage mediums. Various executable components of a program or programs may be stored in different locations. The computer-readable storage medium may for instance be multiple computer-readable storage medium within the same computer system. The computer-readable storage medium may also be computer-readable storage medium distributed amongst multiple computer systems or computing devices.

'Computer memory' or 'memory' or 'storage' is an example of a computer-readable storage medium. Computer memory is any memory which is directly accessible to a processor. Examples of computer memory include, but are not limited to: RAM memory, registers, and register files. References to 'computer memory' or 'memory' or 'storage' should be interpreted as possibly being multiple memories. The memory may for instance be multiple memories within the same computer system. the memory may also be multiple memories distributed amongst multiple computer systems or computing devices.

A 'computer system' as used herein encompasses to any device comprising a processor. A 'processor' as used herein encompasses an electronic component which is able to execute program code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computer system should also be interpreted to possibly refer to a collection or network of computing devices each comprising a processor or processors.

A 'user interface' as used herein is an interface which allows a user to interact with a computer or computer system. A 'user interface' may also be referred to as a 'human interface device.' A user interface may provide information or data to the user and/or receive information or data from the user. A user interface may enable input from an user to be received by the computer and may provide output to the user from the computer. In other words, the user interface may allow an user to control or manipulate a computer and the interface may allow the computer indicate the effects of the user's control or manipulation. The display of data or information on a display or a graphical user interface is an example of providing information to a user. The receiving of data through a keyboard, mouse, trackball, touchpad, pointing stick, graphics tablet, joystick, gamepad, webcam, headset, gear sticks, steering wheel, pedals, wired glove, dance pad, remote control, one or more switches, one or more buttons, and accelerometer are all examples of user interface components which enable the receiving of information or data from a user.

A 'display' or 'display device' as used herein encompasses an output device or a user interface adapted for displaying images or data. A display may output visual, audio, and or tactile data. Examples of a display include, but are not limited to: a computer monitor, a television screen, a touch screen, tactile electronic display, Braille screen, Cathode ray tube (CRT), Storage tube, Bistable display, Electronic paper, Vector display, Flat panel display, Vacuum fluorescent display (VF), Light-emitting diode (LED) displays, Electroluminescent display (ELD), Plasma display panels (PDP), Liquid crystal display (LCD), Organic light-emitting diode displays (OLED), a projector, and Head-mounted display.

A 'database' as used herein encompasses a data file or repository which contains data that may be accessed by a processor. Examples of databases are, but are not limited to: a data file, a relational database, a file system folder containing data files, a collection of data tables and a spreadsheet file.

In accordance with embodiments of the invention, a computer-readable storage medium is provided that comprises checking the request to activate a Switch BC Set in the reversible test client to ensure compatibility of associated enhancement functions.

In accordance with embodiments of the invention, the computer-readable storage medium is provided wherein an enhancement function is incompatible if it includes methods that must be executed after Switch BC Set activation.

In accordance with embodiments of the invention, the computer-readable storage further comprising: receiving input indicating if an activation in the reversible test client should be accepted or rejected.

In accordance with embodiments of the invention, the computer-readable storage medium further comprising: responsive to the input indicating rejected; deleting the reversible test client.

In accordance with embodiments of the invention, the computer-readable storage medium further comprising: responsive to the input indicating accepted: deleting the reversible test client, making the at least one associated data or code set accessible to all clients, and setting the status for each enhancement function from "activated in test mode" to active.

In accordance with embodiments of the invention, the electronic processor of the computers system is further configured to: check the request to activate a Switch BC Set in the reversible test client to ensure compatibility of associated enhancement functions.

In accordance with embodiments of the system, an enhancement function is incompatible if it includes methods that must be executed after a switch activation.

In accordance with embodiments of the system, the electronic processor is further configured to: receive input indicating if an activation in the reversible test client should be accepted or rejected.

In accordance with embodiments of the system, the electronic processor is further configured to: responsive to the input indicating rejected: delete the reversible test client.

In accordance with embodiments of the system, the electronic processor is further configured to: responsive to the input indicating accepted: delete the reversible test client, making the at least one associated data or code set accessible to all clients, and setting the status for each enhancement function to active.

Embodiments of the invention may provide "undo" (e.g., rollback) features, along with data management simplification features, to an update package model of software suite development/evolution. New functions, which may have disruption effects for customers, may be installed into the core configuration data with inactive switches. Upon activation, a switch status may change, and a query filter may use the activated function (e.g., as associated with the switch ID). Original functions may be maintained, giving the user the ability to deactivate an activated function, and thereby reverting the system back to the prior configuration status.

FIG. 1 shows a multi-client computer system 100. The multi-client computer system 100 may be implemented as one or more server computer systems to which multiple user devices, such as personal computers 102.1, 102.2, 102.3, 102.4, . . . 102.m are coupled such as via a network 104. Preferably, network 104 is an intranet or other private network as all end-user devices that are coupled to the computer system 100 belong to the same company that also runs the computer system 100. Hence, unlike state of the art multi-client computer systems the computer system 100 of the FIG. 1 embodiment is used for a single company.

The computer system 100 comprises storage 106. The storage 106 serves for storage of executable program code 108 that is installed on the computer system 100 for execution by the processor 112. The program code 108 comprises a plurality of conditional program jumps, such as an if-then or an if-else statement or another kind of conditional program jump depending on the programming language. By way of example FIG. 1 shows that the program code 108 contains the conditional program jump 'if (switch ID, status) then . . . '.

The condition '(switch ID, status)' is fulfilled, if the software switch that is identified by the switch identifier (ID) has the status, i.e. the logical value, as indicated in the condition.

The computer system comprises a log-in component 114 for logging in a plurality of registered users that are given in a table 116 of the log-in component 114. The table 116 contains the user IDs of the registered users and the logical client to which a given user is assigned. In the embodiment considered here all registered users work for the same company such that the logical client to which they are assigned does not specify different companies but different user roles. For example, a user A is identified in the table 116 as being assigned to the test client and is thus given the role of a test user. This also applies for the user B whereas users C and D are assigned to the productive client and are thus specified as productive users in the table 116. It is to be noted that a given human operator may log-in as for example either user A or user C depending on the required role. In other words, if a given operator wants to perform a test he or she logs in as user A whereas the same user may log-in as user C if that operator wants to utilize the computer system 100 in a productive way such as for performing a real transaction.

Upon a user's log-in the respective user can start execution of the program code 108 by the processor 112. If multiple users are logged in multiple instances of the program code 108 can be executed by the processor 112 in parallel as illustrated in FIG. 1. For example, the instance 108.1 of the program code 108 is being executed for the user A, the instance 108.2 for user B, the instance 108.3 for user C and the instance 108.4 for user D.

Data, such as data 118, is stored in the storage 106 for the test client. This data, including data 118, contains user data for the purposes of testing and evaluating a program update and hence do not contain up to date transactional data that is being used for the various transactional tasks executed within the productive client. Further, status data 122 is stored in the storage 106. The status data 122 is also assigned to the test client. It contains a logical value for each switch identified by its respective switch ID. For example the switch having the switch ID I has the status "on", the switch having switch ID II has the status "off" as shown in FIG. 1.

Further, program code 124 that provides a switch framework is stored in the storage 106. The switch framework is activated when a condition of the program code 108 that involves a switch needs to be evaluated.

The program code 124 is executed by the processor 112. When a condition involving a switch needs to be evaluated for the execution of one of the instances of the program code 108 the program code 124 reads the logical value of the respective switch using the switch ID and returns the logical value to the respective instance.

Data 126 that is assigned to the productive client is stored in storage 106. The data 126 and other data of storage 106 that are assigned to the productive client contain real up to date data that is being used for transactional purposes within the productive client. The data 118 can be obtained by copying the data 126.

Likewise, the status data 128 is assigned to the productive client indicating the logical values of switches to be used for the execution of instances of the program code 108 for users that have the assigned role of a productive user.

The data 118, 126 as well as the status data 122, 128 may be comprised in the same or separate databases of the computer system 100.

The execution of an instance of the program code 108 for a test user, such as users A and B, i.e. instances 108.1 and 108.2, involves access operations, such as read and write operations to the data 118 but not to the data 126 such that the data that is being used by the productive client is not corrupted. When a condition involving a switch needs to be evaluated for the execution of the instances 108.1 or 108.2 the program code 124 recognizes that the condition needs to be evaluated for the purposes of the test client and thus uses the status data 122 but not the status data 128 for determining the logical value of the respective switch, i.e. whether the switch has the status 'on' or 'off'. Likewise, execution of other instances of the program code 108 for productive users, such as users C and D, may involve read and write access operations to the data 126 but not to the data 118. The program code 124 uses the status data 128 for determining the logical value of a switch if that is required for evaluating a condition for the execution of the instances 108.3 and 108.4 that belong to the productive client.

The program code 108 can be updated by means of a function 110, that provides an additional or enhanced functionality. The function 110 which may also be referred to in the following as a business function, contains descriptive data 130 that is human readable, and machine readable data 132 that specifies the logical values of one or more of the switches. These switch settings may be given as a list of switch IDs followed by the switch status. Furthermore, a code fragment 120 is contained or is assigned to the function 110 whereby the code fragment 120 implements the additional or enhanced function described by the descriptive data 130. The code fragment 120 is also referred to as 'development object' in the following.

The function 110 can be provided to the computer system 100 such as by reading it from a data carrier, such as a CD ROM, or by downloading it. After the function 110 has been provided to the computer system 100 the program code 108 can be updated as follows:

A human operator 134 may use one of the personal computers, such as personal computer 102.1, for performing a log-in operation. An entry field 136 is shown on the display screen 138 for the operator 134 to enter log-in data. For performing a test of a program update the operator 134 logs in as a test user, such as user A, and thus enters user A's user identifier into the data entry field 136.

The descriptive data 130 of the function 110 is displayed in the display field 140 on the display 138. This way the operator 134 is informed as to the new or enhanced functionalities provided by the function 110. If the operator 134 wants to test the function 110 he or she selects an apply button 142 that is provided by the graphical user interface of the personal computer 102.1.

In response to the operator's 134 selection of the apply button 142 an update program component 144 is started by execution of the update program component 144 by the processor 112. The update program component 144 reads the data 132 that specifies the switch settings to be updated and updates the status data 122 correspondingly as the logged-in user that has selected the apply button 142 is a test user. Hence, only the status data 122 is updated but not the status data 128.

Next, the operator 134 can initiate execution of the updated program code 108 by selecting the run button 146 that is displayed on the display 138. In response, the instance 108.1 is created and executed by the processor 112 using the updated status data 122. This way the operator 134 can test and evaluate the function 110.

If the operator 134 is satisfied by the test and the evaluation of the function 110 he or she can update the program code 108 by the function 110 for the purposes of the productive client. For this purpose the operator 134 logs in as another user that is assigned to the productive client by entering a respective user ID, e.g. he or she enters the user ID of user C into the data entry field 136. In response to selecting the apply button 142 the update program component 144 updates the status data 128 of the productive client by the switch settings specified by the data 132 such that the function 110 is implemented immediately for all users of the productive client.

Depending on the implementation the conditional program jump has the effect that the program execution jumps to the code fragment 120 of the function 110 if the respective condition is fulfilled, such as if the switch specified by its switch ID in the data 132 has the switch status 'on'.

It is important to note that the productive users assigned to the productive client, such as users C and D can work with the computer system 100 for the performance of various transactions irrespective and independently from the execution of the test and the evaluation of the function 110 of test user A that is assigned to the test client. However, after the operator 134 has logged in as a productive user and has entered his or her selection of the function 110 by selecting the apply button 142 the function 110 is immediately made available to all productive users as the status data 128 is updated affecting all users of the productive client.

In accordance with an embodiment of the invention more than one test client can be defined in the table 116 which enables independent evaluation and testing of various functions 110 within the respective test clients.

It is important to note that the data 118, 126 and the status data 122, 126 can be stored in the same database. Each data item of this data is assigned to one of the clients in order to control read and write access to the respective data item. For example, the database contains a first database table for storing the status data 122, 126 and a second database table for storing the data 118, 126. In this case each data set in the first and second tables has a primary database key that comprises an indication of the respective client that has access rights to that line.

An example for a first database table is given below:

| CLIENT | SWITCH_ID | SWITCH_STATUS |
|--------|-----------|---------------|
| 001 | ENHANCEMENT_PERS_ADMIN | off |
| 002 | ENHANCEMENT_PERS_ADMIN | on |
| 003 | ENHANCEMENT_PERS_ADMIN | on |

An example for a second database table is given below:

| CLIENT | Employee_ID | Name | BIRTHDATE | SALARY_GROUP |
|--------|-------------|------|-----------|--------------|
| 001 | 00004711 | Peter Clark | 01.01.1970 | 10 |
| 001 | 00004712 | Peter Maier | 02.02.1971 | 9 |
| 002 | 00000012 | Sue Field | 03.03.1975 | 9 |
| ... | | | | |

Hence, the switch having switch ID "ENHANCEMENT_PERS_ADMIN" is "off" for client 001 and "on" for clients 002 and 003. As regards user data, there are two data sets in the second database table for the client 001 and one data set for the client 002.

As a consequence, users of all clients use the same database but have access only to those data sets in the common database that are assigned to the user's client.

As regards the example shown in FIG. 1 this means that the status data 122 and 128 can be stored in the first database table and that the data 118 and 126 can be stored in the second database table.

It is important to note that a user can be assigned to more than one client.

Figure 2:
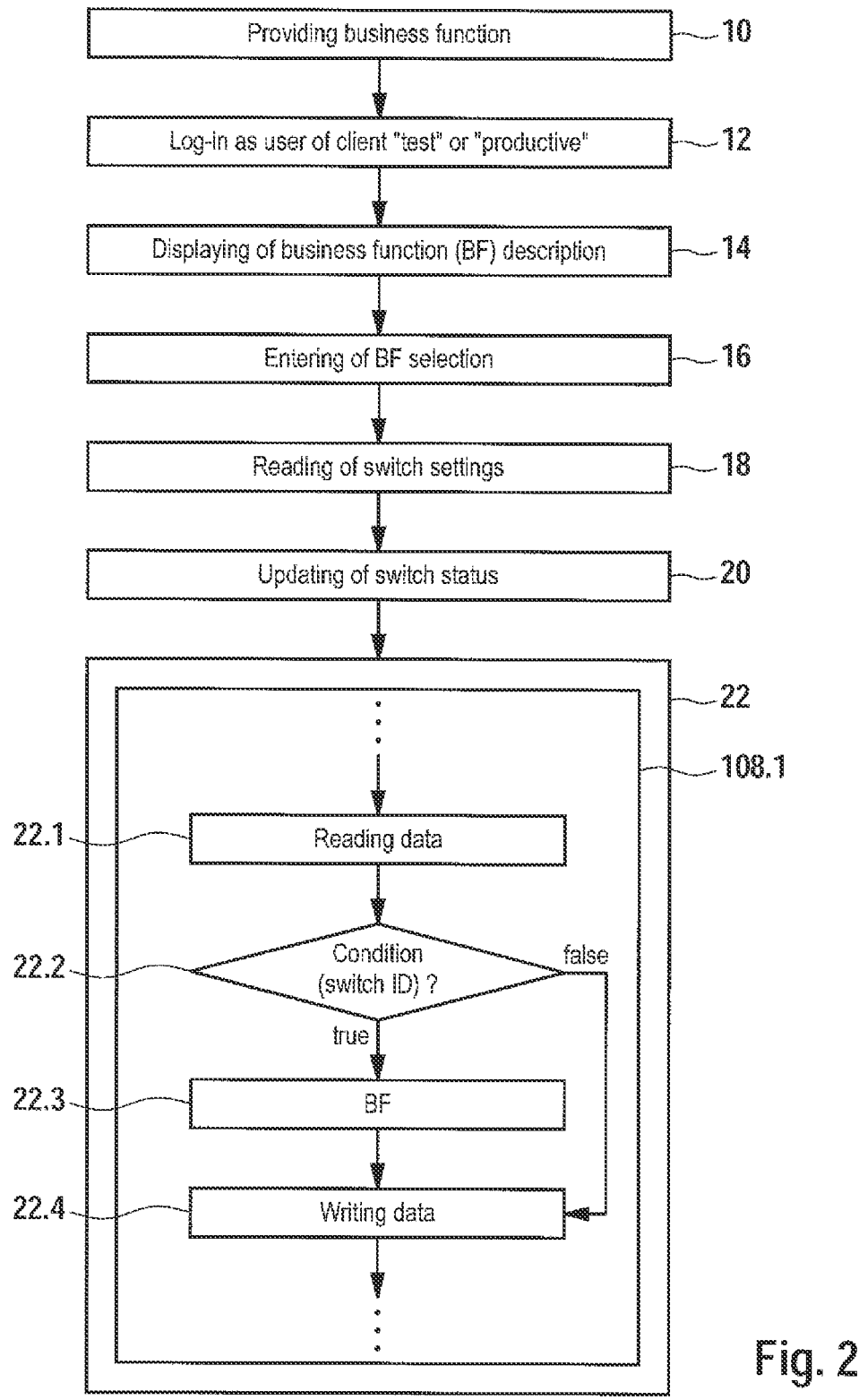
FIG. 2 is a flow diagram illustrating a method according to an embodiment of the present invention.

FIG. 2 shows a flow chart of an embodiment of a method of the invention. In step 10 one or more business functions, such as business function 110 (cf. FIG. 1) are provided to the computer system 100. For example the business function 110 can be stored on a CD ROM or is downloaded via a network and then stored within storage 106 of the computer system 100.

In step 12 a human operator, such as operator 134, performs a log-in operation. The operator 134 may have a dual role such as a test user role and a productive user role. For this purpose the operator 134 has two different user IDs, such as a user ID A that is assigned to a test client and the user ID C that is assigned to the productive client. For testing the business function provided in step 10 the operator 134 logs in as a test user of the test client, hence as user A.

In step 14 the descriptive data 130 of the function 110 is displayed, such as on the display 138 of the personal computer 102.1 that is used by the operator 134. In addition the descriptive data of one or more other business functions that have been provided in step 10 may also be displayed on the display 138. In step 16 the operator 134 enters a selection of at least one of the business functions, such as function 110, into the personal computer 102.1, such as by clicking on the apply button 142. In response, the update program component 144 is invoked in step 18 for reading the data 132 of the selected function 110 and for updating the status data 122 by the switch settings as specified by the data 132 in step 20.

Next, the operator 134 can start execution of the updated program code 108 such as by clicking on the run button 146 in step 22. In response the instance 108.1 of the program code 108 is created and executed for the user A. The execution of the program code may cause one or more access operations for reading and/or writing data from and to the data 118 of the test client, such as in step 22.1 where data is read from the data 118. In step 22.2 a conditional program jump contained in the program code 108 is executed. This involves evaluating the condition specified in the conditional program jump.

The conditional program jump specifies at least one switch ID. For evaluation of the condition the logical value of the switch that is identified by the switch ID has to be obtained. This is done by execution of the program code 124 that reads the logical value of the switch that is identified by the switch ID contained in the conditional program jump from the status data 122. For example, if the switch ID of the conditional program jump is switch ID=I the switch framework implemented by the program code 124 returns the logical value 'on'. Hence, the respective business function, such as business function 110 is executed in step 22.3 which may cause a modification of the data that has been read in step 22.1. This modified data is written back to the data 118 in the following step 22.4.

If the condition that is evaluated in step 22.2 returns 'false' because the status of the switch that is identified in the conditional program jump is 'off' the execution of the business function in step 22.3 is bypassed and the control goes directly to step 22.4.

Figure 3:
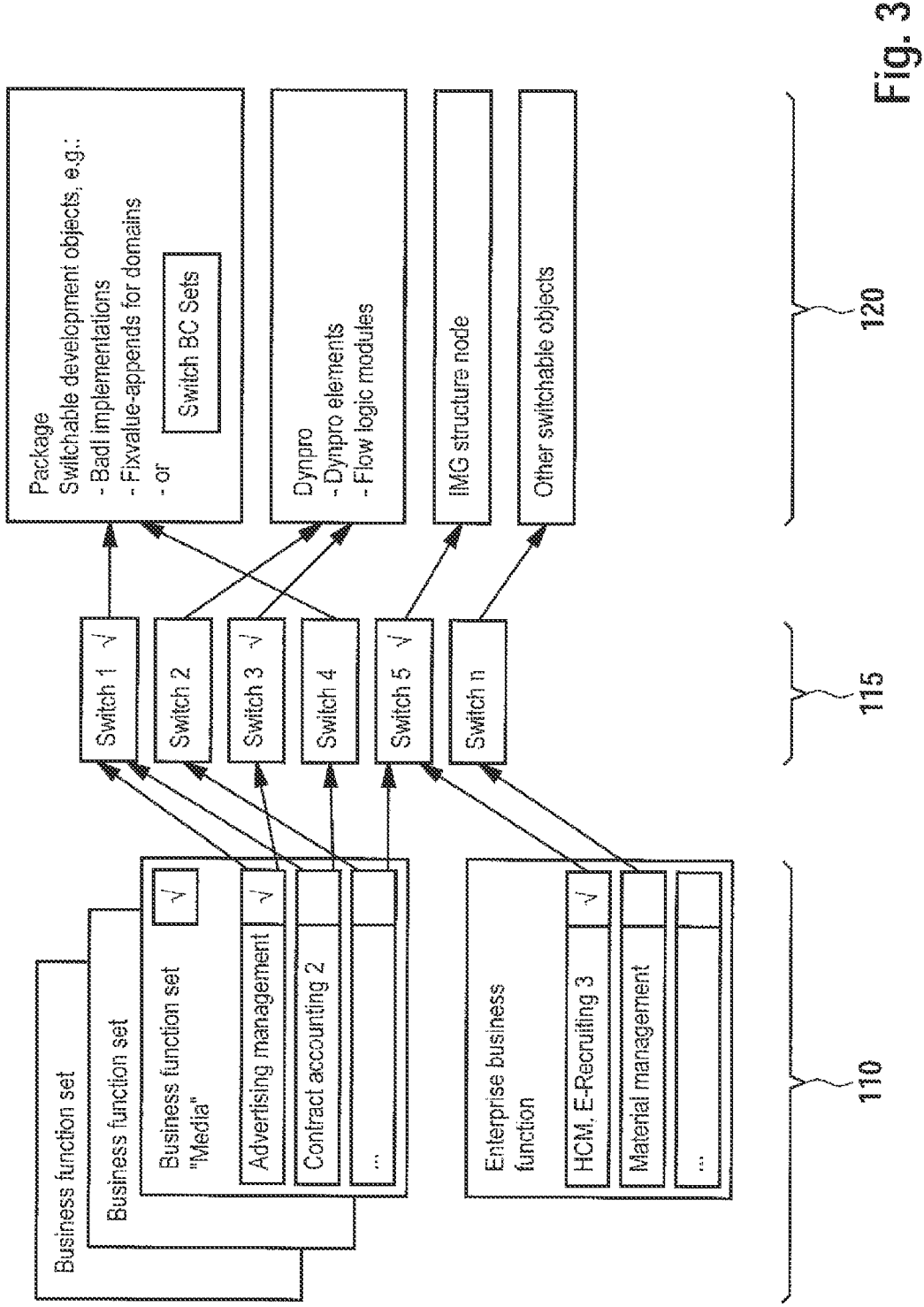
FIG. 3 illustrates an example switch framework, according to one example embodiment of the present invention.

FIG. 3 illustrates an example of the basic architecture of an example switch framework that may be used in a software suite to ensure enhancement package compliant development. On the left, at 110, there are the business functions and business function sets. Business functions (BF) may represent a set of new or changed functionality that is offered as a marketable unit within the enhancement packages. Business functions (which may also be referred to as "enhancement functions" in the context of an enhancement package) may be activated (e.g., switched on) by customers, so that the new functionality becomes visible and can be used in customers' systems. From a technical point of view the activation of a business function may activate switches (e.g., 115). Switches are the connecting part of business functions and development objects. Switches might not be visible to customers directly, and they may instead act 'behind the scenes.' Switches may be assigned to business functions and may activate/switch on when their associated business function gets switched on. On the other side, the development objects (e.g., 120) are assigned to switches and as soon as a switch gets switched on the development objects may become visible and active. Among the development objects is a specific type of development object called a switchable business configuration set ("Switch BC Set"). As a certain type of development object, the Switch BC Sets are therefore assigned to switches and become usable as soon as the assigned switch gets switched on. Making a Switch BC Set usable may include extracting it. The Switch BC Set may include a container of database table entries and these entries may be copied/extracted into the corresponding database table when the switch (to which the Switch BC Set is assigned to) is activated.

However, in this implementation it may be that it is not possible for customers to deactivate (switch off) some or all of the business functions once they are switched on. For customers this may mean that they are not able to test business functions in a convenient way before they decide to use them in the productive system. Even when some testing of reversible business functions is possible in the main test system, it may be required to do it in a separate client and stop any other test activity in the system. This could be because the status of a business function may always be set globally in a customer system so that this status is the same in every client in the system. Thus, continuing tests in the main test clients may mean that these tests are done in the environment of activated business functions which might get deactivated later. The test could therefore produce data which are no longer valid when this business function is deactivated which could make the whole main test client useless. Additionally, the original environment might be influenced by the activated business functions in a way that the results of the tests are not meaningful anymore.

One reason why so few business functions are reversible in current systems is because of the Switch BC Sets assigned to them. The Switch BC Sets are a way to deliver table entries assigned to business functions. They may act as containers that will be extracted when the function's assigned switch gets switched on. Once extracted it may not be possible to undo this, which means that the functions associated with that Switch BC Set are not reversible. Further, the containers may be extracted to a central client of a system, which may be used as a source to copy certain configuration settings to the other clients. Changing table entries in this central client can influence the whole system. Example embodiments of the present invention provide a new way to undo such changes and their impact to other clients. Additionally, example embodiments of the present invention allow reversible business functions to be tested without disrupting any of the other tests running on that system.

In order to increase the number of business functions that are reversible, example embodiments of the present invention create three tools for the enhancement package system. Example embodiments may include a new type of client, e.g., a business function reversibility test client. Additionally, example embodiments may include a Switch BC Set activation method when activating a business function in the reversibility test client. Finally, example embodiments may include a client specific, and optionally user-specific business function activation method in the business function reversibility test client.

The business function reversibility test client may behave similarly to already existing clients, but may differ in offering some specific behavior when activating business functions and Switch BC Set (as described further below). The main purpose of this type of client may be to test reversible business functions. Further, in a customer test system it may be possible to have more than one business function reversibility test client. This may be useful when different sets of business functions or different combinations of business functions are tested simultaneously. This business function reversibility test client may be recognized at runtime as a testing client. For example, there may be a table where all clients and their attributes are stored, and this table may be extended with a new fields/column which may be exclusively used to identify business function reversibility test clients. Additionally or alternatively, there may be a switch framework parameter table with a new parameter to hold the information about which clients in a system is the business function reversibility test client. While it may be a requirement to have the ability to identify which clients are business function reversibility test clients, this function may be implemented in any number of other ways, and only two illustrative examples are provided here.

In conjunction with the new business function reversibility test client, example embodiments may include business function sets (e.g., 110) that behave differently than they do in common clients, when activated in the BF reversibility test client. For example, once activated they may only be extracted into the BF reversibility test client and not in any other client (e.g., the template client). This may ensure that no other client will be affected by the business function set activation and by the test of the associated reversible business functions in the BF reversibility test client.

In cases where a business function has to be switched off after the test (e.g., because the test showed that the functionality offered with that business function is not needed etc.) the whole BF reversible test client may be deleted, including all data that were created during the test and including all table entries extracted through Switch BC Set activation. The deletion may be performed such that no other client will be affected. Deletion of a client is a standard procedure offered in existing systems. Likewise, copying or cloning a client is a standard procedure offered in existing systems. Thus, when other reversible business functions need to be tested a whole new BF reversibility test client may be setup, which may be a copy of the main test client of the system.

In cases where the business function proved worthy to be used in the actual productive system, it may be required that it be additionally activated in the other clients. This may be needed since the business function activation was previously restricted to the BF reversibility test client and may have been activated in a special way, e.g., as discussed below. Thus, the BF may need to be activated in the other clients in the system, but this may be done in the usual way. With the above described behavior, all business functions having Switch BC Sets may now be candidates to be reversible.

In addition to the specific behavior from activation of Switch BC Set in BF reversibility test clients, the whole activation of business functions may be different in this reversibility test client. The activation may be restricted to this client and optionally may be restricted even to specific users in this client. Further, it may be that the whole business function will not be activated, but only the switches of a business function. This means the status of the BF may remain inactive/switched off, but all of the switches assigned to the BF may be active/switched on in the BF reversibility client.

Example embodiments of the present invention may leverage certain preexisting tools (e.g., client creation/cloning and client deletion/removing procedures) to extend BF reversibility features into the client systems. A user may start the BF activation as usual in the transaction switch framework that supports the enhancement package platform with the Switch BC Set capabilities. This transaction may now recognize that it runs in a BF reversibility test client. The transaction may then give the user corresponding information, letting him/her know that the BF activation in this client will be different. It may be restricted such that only reversible BFs can be activated in this client and when a reversible one is selected and the activation is started a unique procedure may be executed.

Figure 4:
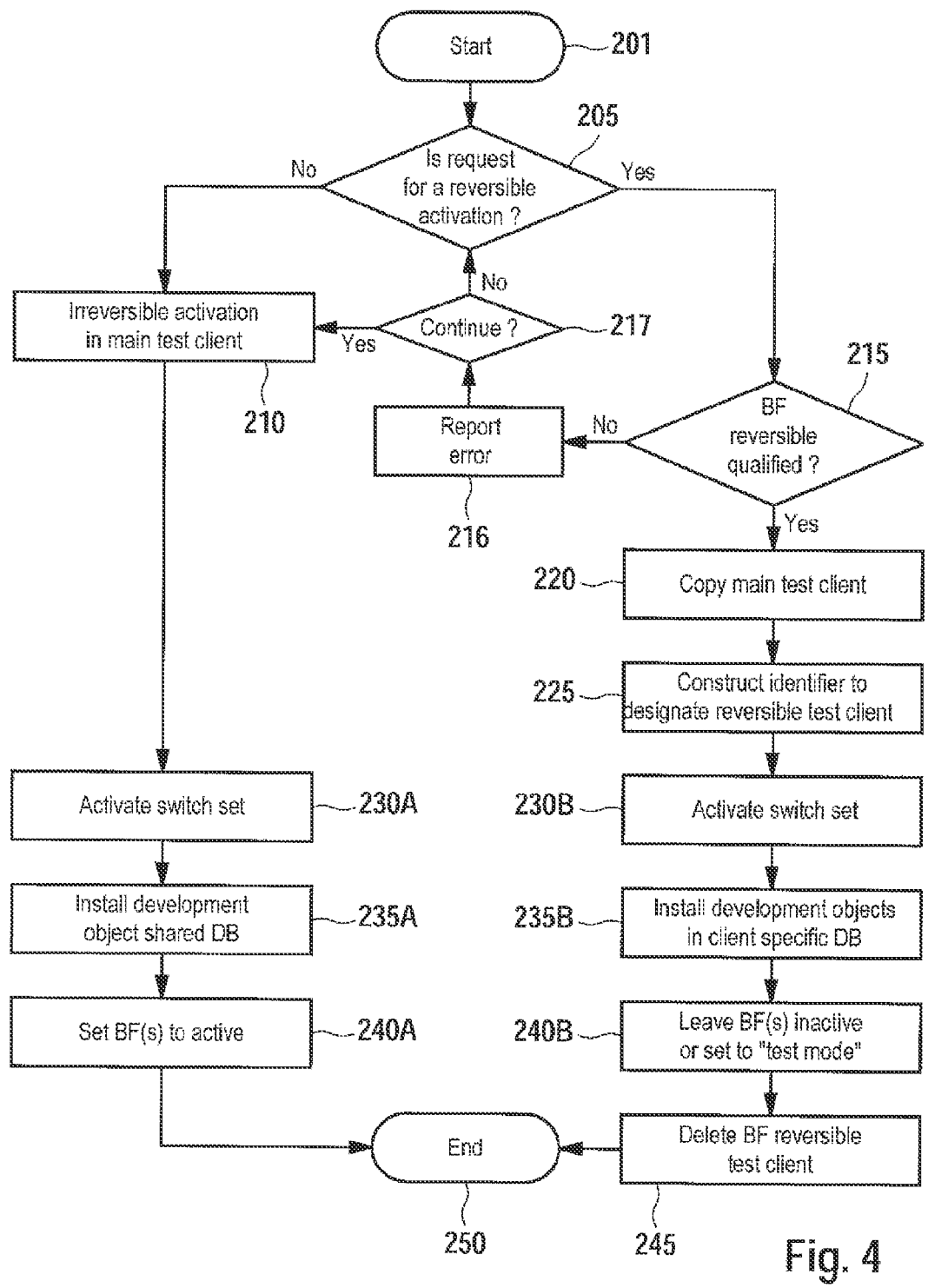
FIG. 4 illustrates an example reversible activation method, according to one example embodiment of the present invention.

FIG. 4 illustrates this new procedure as a reversible extension of the common enhancement package activation procedure. Starting with 201, a request to activate a business function may first be determined as reversible at 205, or regular, e.g., a normal activation of a BF or Switch BC Set, which may be irreversible. A user may specify that the BF or Switch BC Set should be activated in a reversible test client, or in other embodiments the user may specific activation in an existing reversible test client, thus indicating indirectly that the activation should be reversible. If the user indicates that reversible activation is not needed, the example procedure may begin a normal activation at 210, e.g., activation in the main test client or any other system client. However, if the user indicates that the activation should be performed in a business function reversibility test client, then the example procedure may test the indicated BF to determine if the BF qualifies. Since the reversibility is achieved, in part, by activating the switches, but leaving the actual BF as inactive (or "test mode active" which may mean active to the BF test client but inactive to all others), certain BFs may not be eligible for this type of an arrangement. For example, some business functions may have "after switch methods," or methods that must be activated after the associated switch is activated. Other conditions may also preclude a BF from being put in "test mode active," and thus, at 216, a user may be informed of the ineligibility. Further, at 217, a user may be asked if he or she would like to proceed with a regular activation in the main test client.

If, however, a BF is eligible for a BF reversibility test client, then at 220, a new BF reversibility test client may be created by cloning the main test client. In other embodiments the reversibility test client may already exist, e.g., because multiple reversible activations occur in a single test client. In order to ensure that the relevant Switch BC Set are only activated and installed in the BF reversibility test client, this test client should be uniquely identified among the other clients that generally have switches activated globally. At 225 an identifier may be constructed to designate this reversibility test client, e.g., via the client table method or added field method discussed above. At this point, e.g., 230 to 240, installation in the main test client and installation in the reversible test client may be fairly similar, but with some key differences.

First, at 230A and 230B, all switches of the business function to be activated may be selected and switched on. However, in the regular activation of development objects at 235A, the Switch BC Set may be activated globally and associated development objects may be activated globally in a database (DB) shared by all of the clients. In 235B, the Switch BC Set may be activated in a client specific way, installing development objects and BF data in a local, reversibility test client specific database. At 240A, activated BFs may be set to active, which may make them visible and active to every client in the system. At 240B, however, the 'activated' business function may get a new status in the switch framework, e.g., 'activated in test mode'. The business functions activated in this way may behave active in the BF reversibility test client, but may not in any other client in the system. A BF reversible test client may remain active for any amount of time, but once testing is concluded the entire client may be deleted at 245.

Since the Switch BC Set were only activated in that client, and the BF remained in a globally inactive state, the deletion of the BF reversibility test client should leave the system in a state as if the BF was never activated at all. Thus, the BF may be 'deactivated' by this deletion, providing a sort of reversibility. The user may now decide to activate the BF in the regular system, which should behave exactly as it did in the BF reversibility test client (being a clone of the regular system main test client), or the user may postpone installation or run further tests. Further tests could be performed in a new BF reversibility test client or the original if not yet deleted. The example embodiment illustrated in FIG. 4 shows a serial execution, but in alternative embodiments it will be appreciated that several instances of the method may run in parallel, with some BFs being installing the main test client concurrently with tests being performed in one or more BF reversibility test clients.

In addition to client specific activation, example embodiments may provide a user specific activation. If the user specific switching option is used, the business function may behave in an active state only for the specified users and inactive for any others. With this it may be possible to semantically test independent business functions in the same BF reversibility test client. Users responsible for the tests of certain business functions may have them activated while other business functions remain inactive for that group of users. Customers may therefore not necessarily be forced to work with multiple BF reversibility test clients by using user specific activations within a single test client. A restriction to semantically independent business functions may be necessary to avoid interferences between business functions having dependencies. Such interferences may materially affect the test results. To test business functions from the same or a similar area of business another BF reversibility test client may be needed. This way it may be possible to test a certain combination of business functions of the business area in one client and another combination of business function from the same area in another client. Customers might use this option to test which combination of business functions provides the best functionality for their specific system.

The business functions to be tested may stay inactive/switched off, while only their switches get activated, and this may also be true for every other client in the system. Therefore, tests running in any other client will not be affected by this business function. This may allow parallel tests in the same system (but in different clients) which will not disrupt each other.

With the new type of client, the BF reversibility test client, there may be clear criterion in a customer system that can be used as a trigger for several specific behaviors related to activating business functions. This criterion may be used by the Switch BC Set activation as a signal that the activation has to be restricted to the BF reversibility test client, and it is also used by the business function activation as a signal to do a client specific—and optionally also a user specific—activation of the switches assigned to the business function. Activating Switch BC Set in a client specific way enables many additional business functions to be reversible and the specific BF activation enables customers to continue tests in the common test clients while testing reversible business function in a BF reversibility test client.

From a technical point of view users may be able to do the activation of reversible business functions as usual in the transaction switch framework, but by specifically doing the activation in a reversibility test client the activation may follow a different, more isolated procedure. As discussed, the business function itself may not be activated, but instead, only the associated switches of that business function may be activated. Further, the switches may not be activated as usual, but only activated for the BF reversibility test client in which the activation was started. Optionally it will be possible to do the activation only for a certain set of users. Using this user specific switching option may enable customers to test different (semantically independent) business functions in the same BF reversibility test client simultaneously. Working with multiple BF reversibility test clients may enable customers even to test different business functions which belong to the same area of business in parallel.

FIG. 5 illustrates one example system, according to an example embodiment of the present invention. The example may include one or more server computer systems, e.g., Client system 310. This may be one server, a set of local servers, or a set of geographically diverse servers. Each server may include an electronic computer processor 302, one or more sets of memory 303, including database repositories 305, and various input and output devices 304. These too may be local or distributed to several computers and/or locations. Database 305 may be the globally accessible database storing and facilitating the various clients 306. Further, the clients may include BF reversibility test clients 307, which may have local storage 308 to isolate Switch BC Set activations from the global clients.

Any suitable technology may be used to implement embodiments of the present invention, such as general purpose computers. One or more system servers may operate hardware and/or software modules to facilitate the inventive processes and procedures of the present application, and constitute one or more example embodiments of the present invention. Further, one or more servers may include a computer readable medium, e.g., memory 303, with instructions to cause a processor, e.g., processor 302, to execute a set of steps according to one or more example embodiments of the present invention.

Further, example embodiments of the present invention are directed to one or more processors, which may be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. The one or more processors may be embodied in a server or user terminal or combination thereof. The user terminal may be embodied, for example, a desktop, laptop, hand-held device, Personal Digital Assistant (PDA), television set-top Internet appliance, mobile telephone, smart phone, etc., or as a combination of one or more thereof. The memory device may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor which, when executing the series of computer instructions, performs or facilitates the performance of all or part of the disclosed methods and procedures.

It should be understood that there exist implementations of other variations and modifications of the embodiments of the present invention and its various aspects, as may be readily apparent to those of ordinary skill in the art, and that embodiments of the present invention are not limited by specific embodiments described herein. Features and embodiments described above may be combined. It is therefore contemplated to cover any and all modifications, variations, combinations or equivalents that fall within the scope of the basic underlying principals disclosed and claimed herein.

We claim:

1. A method of updating executable program code being installed on a multi-client computer system, the program code comprising a plurality of conditional program jumps, each conditional program jump comprising a condition, the fulfillment of the condition depending on a logical value of one or more of a plurality of software switches, each of the software switches having an assigned predefined unique identifier, wherein the one or more software switches of the condition are given in the conditional program jump by the respective identifier or identifiers, the multi-client computer system comprising a log-in component for logging in a plurality of registered users, each of the users being assigned to one of a plurality of logical clients, the plurality of logical clients comprising at least first and second test clients for testing the updated program code and at least one productive client for productive use of the program code and the updated program code, the multi-client computer system to execute the program code and the updated program code for multiple users in parallel, the computer system further comprising a storage component for storing a plurality of the logical values of the software switches, a first set of logical values being assigned to the first test client, a second set of logical values being assigned to the second test client, and a third set of logical values being assigned to the productive client, and for storing at least first, second, and third sets of data, the first set of data being assigned to the first test client, the second set of data being assigned to the second test client, and the third set of data being assigned to the productive client, wherein the first set of data and the first set of logical values is accessed upon execution of the updated program code for a user that is assigned to the first test client, wherein the second set of data and the second set of logical values is accessed upon execution of the updated program code for a user that is assigned to the second test client, and wherein the third set of data and the third set of logical values is accessed upon execution of the program code or the updated program code for a user that is assigned to the productive client, further comprising a selection component for a user's selection of at least one function for updating the program code, the function comprising human-readable descriptive data for describing the function and machine-readable data specifying the logical value of at least one of the switches using the respective identifier of the at least one of the switches, the method comprising:

providing a plurality of functions for access by the computer system, performing a user log-in of a first user and a second user using the log-in component, the first user being assigned to the first test client and the second user being assigned to the second test client, selecting at least one function by the first and second users using the selection component, wherein the selection by the second user includes one or more functions not selected by the first user, updating the first and second sets of logical values by the logical values contained in the machine-readable data of the at least one function selected by the first and second users, executing the resultant updated program code for the first and second users accessing the first and second sets of data and the updated first and second sets of logical values for testing the at least one function selected by the first and second users, wherein the selecting of at least one function, the updating of the logical values, and the executing of the resultant updated program code are performed independently for the first and second users, receiving an input from at least one of the first and second users indicating the updated program code is accepted, performing a user log-in of a third user using the log-in component, the third user being assigned to the productive client, selecting at least one function by the third user using the selection component, wherein the selection component includes access to the updated program code accepted by at least one of the first and second users, updating the third set of logical values by the logical values contained in the machine-readable data of the selected function, and executing the resultant updated program code for the third user and for other users being assigned to the productive client.

2. The method of claim 1, the function further comprising an executable code fragment, wherein the executable code fragment is executed upon fulfillment of the condition comprised in the one of the conditional program jumps.

3. The method of claim 1, wherein multiple instances of the program code are being executed for a plurality of users that are assigned to the productive client in parallel to the execution of the updated program code for the first and second users that are assigned to the test client.

4. A non-transitory computer-readable storage medium encoded with instructions configured to be executed by a processor, the instructions which, when executed by the processor, cause the performance of a method of updating executable program code being installed on a multi-client computer system, the executable program code comprising a plurality of conditional program jumps, each conditional program jump comprising a condition, the fulfillment of the condition depending on a logical value of one or more of a plurality of software switches, each of the software switches having an assigned predefined unique identifier, wherein the one or more software switches of the condition are given in the conditional program jump by the respective identifier or identifiers, the instructions comprising a log-in component for logging in a plurality of registered users, each of the users being assigned to one of a plurality of logical clients, the plurality of logical clients comprising at least first and second test clients for testing the updated program code and at least one productive client for productive use of the program code and the updated program code, the processor to execute the program code and the updated program code for multiple users in parallel, the multi-client computer system further comprising a storage component for storing a plurality of the logical values of the software switches, a first set of logical values being assigned to the test client, a second set of logical values being assigned to the second test client, and a third set of logical values being assigned to the productive client, and for storing at least first, second, and third sets of data, the first set of data being assigned to the first test client, the second set of data being assigned to the second test client, and the third set of data being assigned to the productive client, wherein the first set of data and the first set of logical values is accessed upon execution of the updated program code for a user that is assigned to the first test client, wherein the second set of data and the second set of logical values is accessed upon execution of the updated program code of a user that is assigned to the second test client, and wherein the third set of data and the third set of logical values is accessed upon execution of the program code or the updated program code for a user that is assigned to the productive client, further comprising a selection component for a user's selection of at least one function for updating the program code, the function comprising human-readable descriptive data for describing the function and machine-readable data specifying the logical value of at least one of the switches using the respective identifier of the at least one of the switches, the method comprising:

providing a plurality of functions for access by the computer system, performing a user log-in of a first user and a second user using the log-in component, the first user being assigned to the first test client and the second user being assigned to the second test client, selecting at least one function by the first and second users using the selection component, wherein the selection by the second user includes one or more functions not selected by the first user, updating the first and second sets of logical values by the logical values contained in the machine-readable data of the at least one function selected by the first and second users, executing the resultant updated program code for the first and second users accessing the first and second sets of data and the updated first and second sets of logical values for testing the at least one function selected by the first and second users, wherein the selecting of at least one function, the updating of the logical values, and the executing of the resultant updated program code are performed independently for the first and second users, receiving an input from at least one of the first and second users indicating the updated program code is accepted, performing a user log-in of a third user using the log-in component, the third user being assigned to the productive client, selecting at least one function by the third user using the selection component, wherein the selecting by the third user includes access to the updated program code accepted by at least one of the first and second users, updating the third set of logical values by the logical values contained in the computer-readable data of the at least one function selected by the third user, and executing the resultant updated program code for the third user and for other users being assigned to the productive client.

5. The non-transitory computer-readable storage medium of claim 4, the function further comprising an executable code fragment, wherein the executable code fragment is executed upon fulfillment of the condition comprised in the one of the conditional program jumps.

6. The non-transitory computer-readable storage medium of claim 4, wherein multiple instances of the program code are being executed for a plurality of users that are assigned to the productive client in parallel to the execution of the updated program code for the first and second users that are assigned to the first and second test clients.

7. A multi-client computer system having at least one processor to execute program code and updated program code for multiple users in parallel, the program code being installed in a computer-readable storage medium of the multi-client computer system and comprising a plurality of conditional program jumps, each conditional program jump comprising a condition, the fulfillment of the condition depending on the logical value of one or more of a plurality of software switches, each of the software switches having an assigned predefined unique identifier, wherein the one or more software switches of the condition are given in the conditional program jumps by the respective switch identifier or identifiers, further comprising a log-in component for logging in a plurality of registered users, each of the users being assigned to one of a plurality of logical clients, the plurality of logical clients comprising at least first and second test clients for testing the updated program code and at least one productive client for productive use of the program code and the updated program code, the multi-client computer system to execute the program code and the updated program code for multiple users in parallel, the multi-client computer system further comprising a storage component for storing a plurality of the logical values of the software switches, a first set of logical values being assigned to the first test client, a second set of logical values being assigned to the second test client, and a third set of logical values being assigned to the productive client, and for storing at least first, second, and third sets of data, the first set of data being assigned to the first test client, the second set of data being assigned to the second test client, and the third set of data being assigned to the productive client, wherein the first and second sets of data and the first and second sets of logical values are accessed upon execution of the updated program code for a user that is assigned to the first test client and a user that is assigned to the second test client, and wherein the third set of data and the third set of logical values is accessed upon execution of the program code or the updated program code for a user that is assigned to the productive client, and a selection component for a user's selection of at least one function for updating the program code, the function comprising human-readable descriptive data for describing the function and machine-readable data specifying the logical value of at least one of the switches using the respective identifier of the at least one of the switches, and an updating component, wherein the updating component is to update only the first set of logical values upon a first user's selection of at least one function, the first user being assigned to the first test client, to update the second set of logical values upon a second user's selection of at least one function, and for updating the third set of logical values upon a third user's selection of at least one function, the third user being assigned to the productive client, wherein the at least one function selected by the second user includes one or more functions not selected by the first user, wherein the selection of at least one function, and the updating of the logical values are performed independently for the first and second users, and wherein the selection component includes access to the updated program code upon receipt of an input from at least one of the first and second users indicating the updated program code is accepted.

8. The computer system of claim 7, the function further comprising an executable code fragment, wherein the executable code fragment is executed upon fulfillment of the condition comprised in the one of the conditional program jumps.

9. The computer system of claim 7, wherein multiple instances of the program code are being executed for a plurality of users that are assigned to the productive client in parallel to the execution of the updated program code for the first and second users that are assigned to the first and second test clients.

10. A method for providing reversible enhancement functions in a software system utilizing an enhancement package and switch framework, the method comprising:

constructing, with an electronic processor, first and second reversible test clients by copying a main test client from an electronic storage medium;

enhancing the first and second reversible test clients with identifiers, such that each reversible test client can be distinguished from other types of clients;

responsive to receiving a request to activate a plurality of enhancement functions in the main test client:

activating a first switch associated with a first subset of the plurality of enhancement functions and a second switch associated with a second subset of the plurality of enhancement functions, activating a first switchable business configuration set associated with the first switch and a second switchable business configuration set associated with the second switch, wherein the activating includes installing at least one associated data or code set, the installation to be accessible to all clients, and setting a status for each enhancement function associated with the first and second switchable business configuration sets from inactive to active;

responsive to receiving a request to activate the enhancement functions in the reversible test clients:

activating the first switch associated with the first subset of enhancement functions and the second switch associated with the second subset of enhancement functions without activating the enhancement functions, activating the first switchable business configuration set associated with the first switch, wherein the activating includes installing at least one associated data or code set in only the first reversible test client, and setting the status for each enhancement function associated with the first switchable business configuration set such that the enhancement functions continue to be inactive for all other clients, including the main test client, and active for the first reversible test client; and activating the second switchable business configuration set associated with the second switch, wherein the activating includes installing at least one associated data or code set in only the second reversible test client, and setting the status for each enhancement function associated with the second switchable business configuration set such that the enhancement functions continue to be inactive for all other clients, including the main test client, and active for the second reversible test client, responsive to receiving a request to activate the first subset of enhancement functions in a productive client:

activating the first switch associated with the first subset of enhancement functions without activating the enhancement functions, activating the first switchable business configuration set associated with the first switch, wherein the activating includes installing at least one associated data or code set in the productive client, and setting the status for each enhancement function associated with the first switchable business configuration set such that the enhancement functions are active for the productive client.

11. The method of claim 10, further comprising: checking the request to activate a switchable business configuration set in the reversible test client to ensure compatibility of associated enhancement functions.

12. The method of claim 11, wherein an enhancement function is incompatible if it includes methods that must be executed after a switch activation.

13. The method of claim 10, further comprising: receiving input indicating if an activation in the first or second reversible test client should be accepted or rejected.

14. A non-transitory computer-readable storage medium encoded with instructions configured to be executed by a processor, the instructions which, when executed by the processor, cause the performance of a method, comprising:

constructing, with an electronic processor, first and second reversible test clients by copying a main test client from an electronic storage medium;

enhancing the first and second reversible test clients with identifiers, such that each reversible test client can be distinguished from other types of clients;

responsive to receiving a request to activate a plurality of switchable business configuration sets in the main test client:

activating a first subset of the switchable business configuration sets in the first reversible test client and activating a second subset of the switchable business configuration sets in the second reversible test client, installing at least one associated data or code set, the installation to be accessible to all clients, and setting a status for each enhancement function associated with the switchable business configuration sets from inactive to active;

responsive to receiving a request to activate switchable business configuration sets in the reversible test clients:

activating the first and second subsets of switchable business configuration sets, installing at least one associated data or code set in only the first reversible test client and installing at least one associated data or code set in only the second reversible test client, setting the status for each enhancement function associated with the first subset of switchable business configuration set such that the enhancement function continues to be inactive for all other clients, including the main test client, and active for the first reversible test client, and setting the status for each enhancement function associated with the second subset of switchable business configuration sets such that the enhancement function continues to be inactive for all other clients, including the main test client, and active for the second reversible test client, wherein the activating of first and second subsets of the switchable business configuration sets is performed independently in the first and second reversible test clients, responsive to receiving a request to activate the first subset of switchable business configuration sets from the first test client in a productive client:

activating the first subset of switchable business configuration sets, wherein the activating includes installing at least one associated data or code set in the productive client, and setting the status for each enhancement function associated with the first subset of switchable business configuration sets such that the enhancement functions are active for the productive client.

15. A system for providing reversible enhancement functions in a software system utilizing an enhancement package and switch framework, the system comprising:

an electronic storage medium in communication with an electronic processor, the electronic processor configured to:

construct first and second reversible test clients by copying a main test client from the electronic storage medium;

enhance the first and second reversible test clients with identifiers, such that each reversible test client can be distinguished from other types of clients;

receive a request to activate a plurality of enhancement functions in the main test client, and in response:

activate the plurality of enhancement functions, activate first and second switches associated with first and second subsets of the enhancement functions, activate at least one switchable business configuration set associated with each of the first and second switches, which includes installing at least one associated data or code set, the installation to be accessible to all clients, and set a status for each enhancement function associated with each switchable business configuration set associated with the first and second switches from inactive to active, receive a request to activate the plurality of enhancement functions in the first and second reversible test clients, and in response:

activate the first and second switches associated with the first and second subsets of enhancement functions without activating the enhancement functions, activate the at least one switchable business configuration set associated with the first switch, including installing at least one associated data or code set in only the first reversible test client, set a status for each enhancement function associated with the at least one switchable business configuration set such that the enhancement function continues to be inactive for all other clients, including the main test client, and active for the first reversible test client, and set a status for each enhancement function associated with the at least one switchable business configuration set such that the enhancement function continues to be inactive for all other clients, including the main test client, and active for the second reversible test client, wherein the activating of the first switch and at least one switchable business configuration set associated with the first switch is performed independently of the activating of the second switch and the at least one switchable business configuration switch associated with the second switch, receive a request to activate the enhancement functions from the first test client in a productive client:

activate the first switch associated with the first subset of enhancement functions without activating the enhancement functions, activate the at least one first switchable business configuration set associated with the first switch, wherein the activating includes installing at least one associated data or code set in the productive client, and set the status for each enhancement function associated with the at least one first switchable business configuration set such that the enhancement functions are active for the productive client.

* * * * *